United States Patent
Afram et al.

(10) Patent No.: US 8,805,729 B2
(45) Date of Patent: Aug. 12, 2014

(54) MULTI-PLATFORM NETWORK FOR PROVIDING ORDERING SERVICES

(75) Inventors: Andrew J. Afram, Somerville, MA (US); D. Beau Morley, Somerville, MA (US); Hannah Y. Moon, Boston, MA (US); Joel S. Angiolillo, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 853 days.

(21) Appl. No.: 11/862,968

(22) Filed: Sep. 27, 2007

(65) Prior Publication Data

US 2009/0089183 A1 Apr. 2, 2009

(51) Int. Cl.
*G06Q 30/00* (2012.01)

(52) U.S. Cl.
USPC .......................... 705/27.1; 705/26.1

(58) Field of Classification Search
USPC ...................... 705/1, 26, 26.1–27.2
See application file for complete search history.

(56) References Cited

U.S. PATENT DOCUMENTS

| | | | | |
|---|---|---|---|---|
| 5,907,275 | A * | 5/1999 | Battistini et al. | 340/286.09 |
| 5,956,391 | A * | 9/1999 | Melen et al. | 379/114.01 |
| 7,162,437 | B2 * | 1/2007 | Shaak et al. | 705/26 |
| 7,238,024 | B2 * | 7/2007 | Rehbein et al. | 434/157 |
| 2002/0007321 | A1 * | 1/2002 | Burton | 705/26 |
| 2003/0141360 | A1 * | 7/2003 | De Leo et al. | 235/379 |
| 2004/0230496 | A1 * | 11/2004 | Neuman et al. | 705/26 |
| 2005/0108319 | A1 * | 5/2005 | Kohno et al. | 709/201 |
| 2005/0240773 | A1 * | 10/2005 | Hilbert et al. | 713/182 |
| 2006/0184348 | A1 * | 8/2006 | Schattka et al. | 703/22 |
| 2007/0088624 | A1 * | 4/2007 | Vaughn et al. | 705/26 |
| 2007/0156521 | A1 * | 7/2007 | Yates | 705/14 |
| 2008/0196071 | A1 * | 8/2008 | Manthoulis | 725/100 |

OTHER PUBLICATIONS

Michael L. Kasavana and Jeremy Rock, "eMenus: The Future is NOW!" Club Management, Oct. 2004. Retrieved via Proquest on Jun. 20, 2009.*
"Campusfood.com Launches TXT and One-Click Food Ordering", http://www.campusfood.com, Aug. 28, 2007 (Print Date), 2 pages.
"Find Online Delivery and Takeout Menus from Local Area Restaurants with Exclusive Discounts and Online Ordering", http://www.campusfood.com, Aug. 27, 2007 (Print Date), 9 pages.
"Dining In—Fast Restaurant and Food Delivery Service! Home Page", https://www.diningin.com, Aug. 27, 2007 (Print Date), 3 pages.
"Hungry? EatNow.com", http://eatnow.com, Aug. 27, 2007 (Print Date), 6 pages.
"Takeout Taxi / FineFood2U-Home", http://www.finefood2U.com, Aug. 27, 2007 (Print Date), 6 pages.
"Seamless Web :: Order Delivery and Takeout Food Online at 1,500+ Restaurants with Sea . . . ", http://www2.seamlessweb.com, Aug. 27, 2007 (Print Date), 10 pages.
"NightOwl Deliveries", http://nightowldeliveries.com, Aug. 27, 2007 (Print Date), 3 pages.

(Continued)

*Primary Examiner* — Michael Misiaszek

(57) ABSTRACT

A food ordering system may receive, from a user, a request to place a food order, identify the user, identify a type of user device used by the user to place the request, identify a user interface client that is tailored to the type of the user device, receive, via the user interface client, input from the user to establish the food order, and provide the food order to a restaurant.

25 Claims, 15 Drawing Sheets

(56) References Cited

OTHER PUBLICATIONS

"MSN TV: From Wikipedia, the free encyclopedia", http://en.wikipedia.org, Aug. 28, 2007 (Print Date), 6 pages.

"MSN TV: MSN TV Home Page", http://msntv.com, Aug. 28, 2007 (Print Date), 8 pages.

* cited by examiner

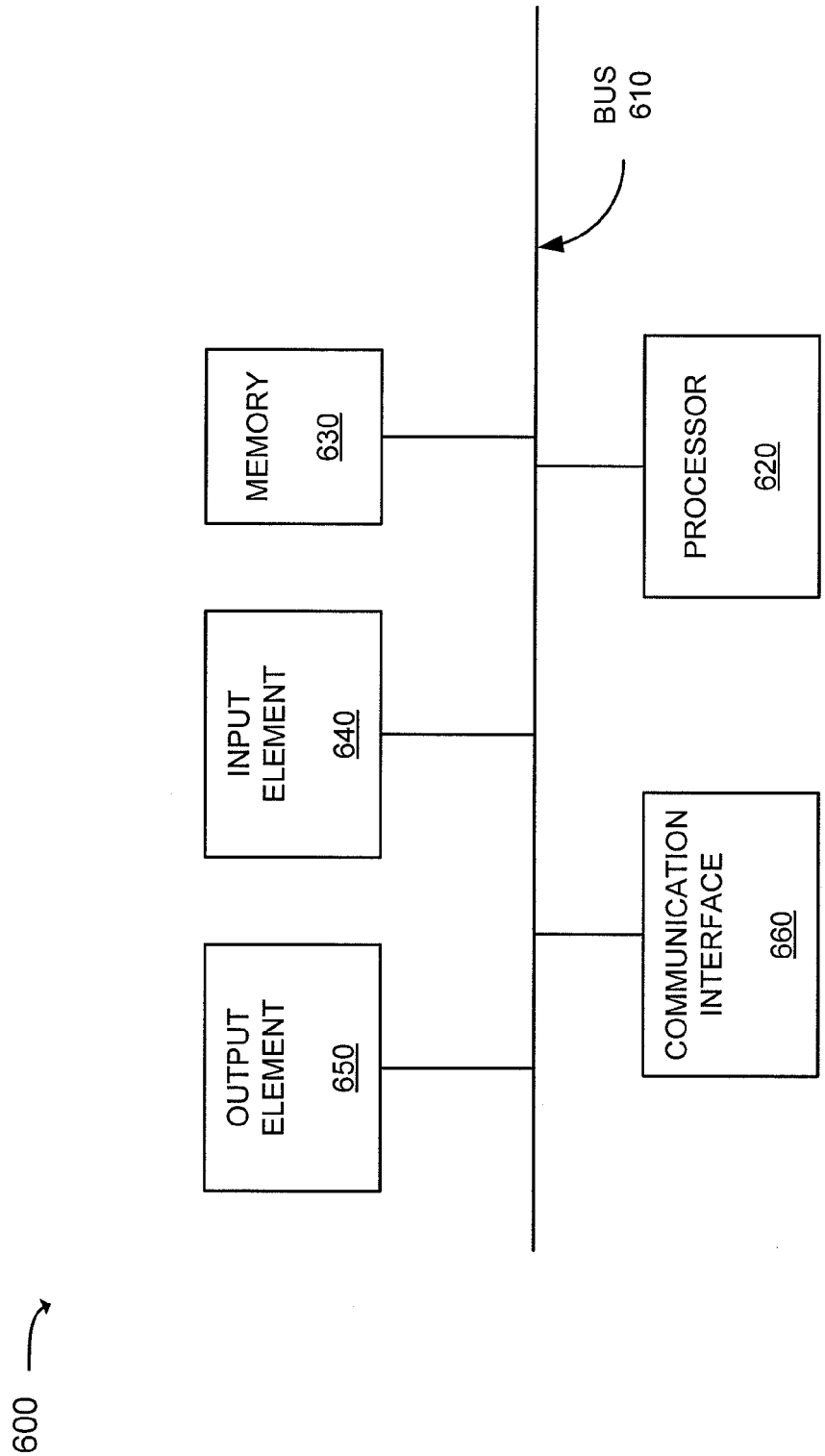

MULTI-PLATFORM NETWORK FOR PROVIDING ORDERING SERVICES

BACKGROUND

Ordering take-out or delivery food has been a common occurrence for most households within the United States for many years now. The process of ordering take-out or delivery, however, has not changed that much. Typically, the first step is for someone to find the right menu, which could be a difficult task in itself. The menu may have been misplaced, lost, or even become out-of-date. Then, once the menu is found, different members of the household have to take their turn to look at it since there is no easy way to look at the menu at the same time.

BRIEF DESCRIPTION OF THE DRAWINGS

FIG. 6 is a diagram of exemplary elements of a component of FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide a multi-platform network that facilitates the ordering of items by a number of different types of devices, such as a television device, a mobile device, and/or a computer device. The multi-platform network may provide an interface that is tailored to the user and/or to the device that the user is using to order an item.

In the description to follow, a multi-platform network will be described as facilitating the ordering of food items from restaurants. It should be understood, however, that the description equally applies to the ordering of other types of items, such as food items from grocery stores, products (e.g., household supplies, pet supplies, electronics, prescriptions, etc.), and/or services.

Figure 1:
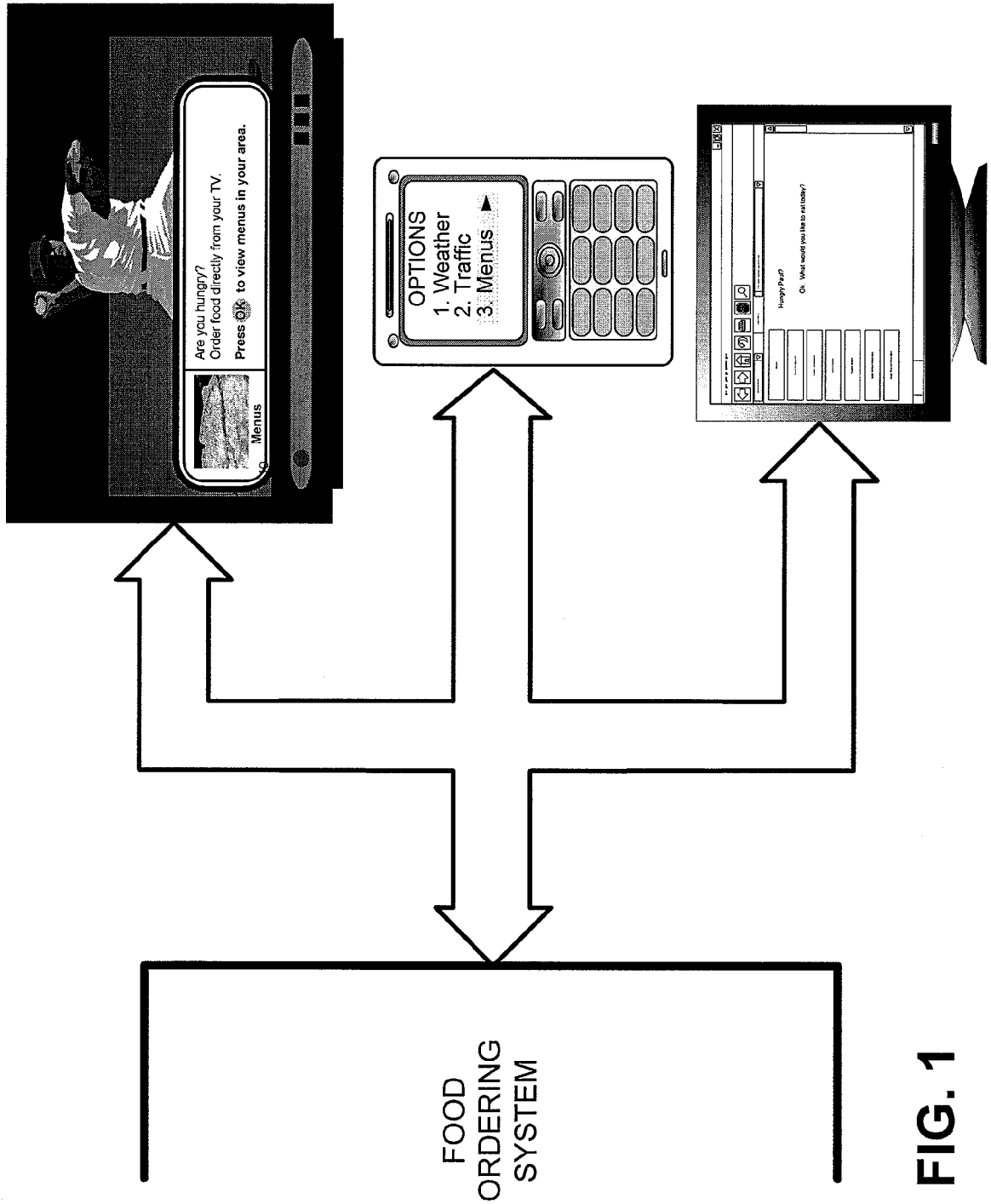
FIG. 1 is a diagram that illustrates an overview of an implementation described herein.

FIG. 1 is a diagram that illustrates an overview of an implementation described herein. As shown in FIG. 1, a food ordering system may facilitate the ordering of restaurant food items using different types of user devices. For example, a user may interact with his/her television device, mobile device, and/or computer device to order food items. The food ordering system may present a user interface client that is tailored to the type of device that the user is using to communicate with the food ordering system. The user may interact with the user interface client to place a food order, view menu information, get directions to a restaurant, update contact or payment information, or otherwise interact with the food ordering system.

Alternatively, or additionally, the food ordering system may present a user interface that is tailored to the user. In this situation, the food ordering system may use information that it has learned about the user to improve the user's experience. The food ordering system may obtain information about a user through the user's interaction with the food ordering system. In one implementation, the food ordering system may be a service provider (e.g., a provider of television services, mobile communication services, and/or Internet services). In this case, the food ordering system may obtain information about a user through the user's interaction with the service provider outside the food ordering system. This may provide the food ordering system with additional information about a user than would normally be available to the food ordering system. This additional information may be used to improve the user's experience when interacting with the food ordering system.

In one implementation, as described above, the food ordering system may be associated with a service provider. The service provider may include a local or national provider of television services, mobile communication services, and/or Internet services. If the service provider is a national provider of mobile communication services, the food ordering system may offer the food ordering service to users even when the users are traveling. The food ordering system may use information regarding the user's location (e.g., global positioning system (GPS) data) to provide the user with local services (e.g., identify restaurants that are located near the user).

Figure 2:
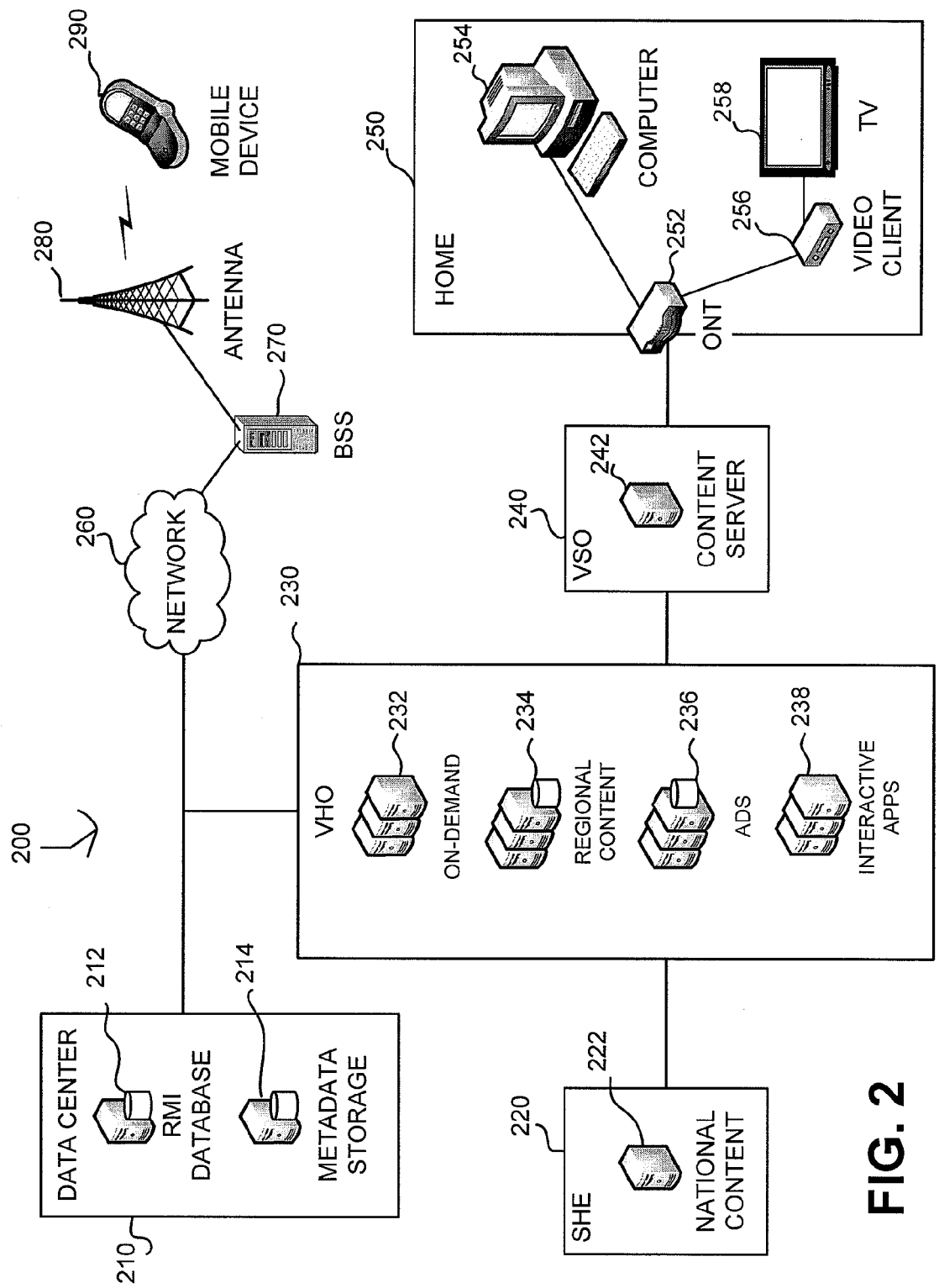
FIG. 2 is a diagram of an exemplary network in which systems and methods described herein may be implemented.

FIG. 2 is an exemplary diagram of a network 200 in which systems and methods described herein may be implemented. Network 200 may include a data center 210, a super head end (SHE) 220, a video hub office (VHO) 230, a video service office (VSO) 240, home components 250, a network 260, a base station system (BSS) 270, an antenna 280, and a mobile device 290. A number of the components of FIG. 2 may operate together to implement a food ordering system. While a certain number and arrangement of components are shown in FIG. 2, there may be a different number or arrangement of components in other implementations. For example, certain components may be combined into a single component, or certain components may be implemented as two or more physically separate components. Also, the connections between components that are shown in FIG. 2 are purely exemplary. These connections may be wired and/or wireless. In another implementation, additional connections may exist that are not shown in FIG. 2.

Data center 210 may connect to VHO 220 and network 260. Data center 210 may include a collection of components that manage and/or store information associated with the food ordering system. As shown in FIG. 2, data center 210 may include a restaurant and menu inventory (RMI) database component 212 and a metadata storage component 214.

RMI database component 212 may include a component that stores restaurant metadata, such as restaurant information, menu items information, and/or other information that might be useful in the food ordering system. The information in RMI database component 212 may be stored in a searchable form. The restaurant information may include information regarding participating restaurants. For example, the restaurant information may include restaurant names, restaurant contact information (e.g., address, telephone number, fax number, email address, etc.), restaurant hours of operation, whether the restaurant offers pick-up and/or delivery, the area(s) to which the restaurant will deliver, directions to the restaurant, a map showing the geographic location of the restaurant, and/or other types of restaurant-related information. The menu items information may include lists of food items offered by the restaurants, prices for the food items, and/or other information that may be present in a restaurant's menu. The other information that might be useful in the food ordering system may include food attributes (e.g., calorie data for food items, ingredients for food items, images of food items, allergy information for food items, descriptors for food items (e.g., vegan, spicy, low calorie, etc.)), coupons, discount codes, special food items, and/or other types of information.

Restaurants may be provided with an interface that enables them to update their information. For example, a restaurant employee may log into a particular web site to update the restaurant's menu or other information. Alternatively, the restaurant employee may send an email to a particular email address or a fax to a particular fax number to update the restaurant's menu or other information. This may provide an easy way for restaurants to distribute their menus and/or assure that the restaurants' menus are current.

Restaurants may also be provided with an interface that enables them to obtain information. For example, a restaurant employee may log into a particular web site to obtain log data on their menu's usage history via the food ordering system. Alternatively, the restaurant employee may receive an email or a fax with the log data. This may provide an easy way for restaurants to track which menu items are popular and how often users are using the food ordering system to place food orders.

Metadata storage component 214 may include a component that stores user and/or user device information. For example, in one implementation, metadata storage component 214 may include a user database and/or a user profile database. These databases may be implemented as a single database or as separate databases.

Figure 3:
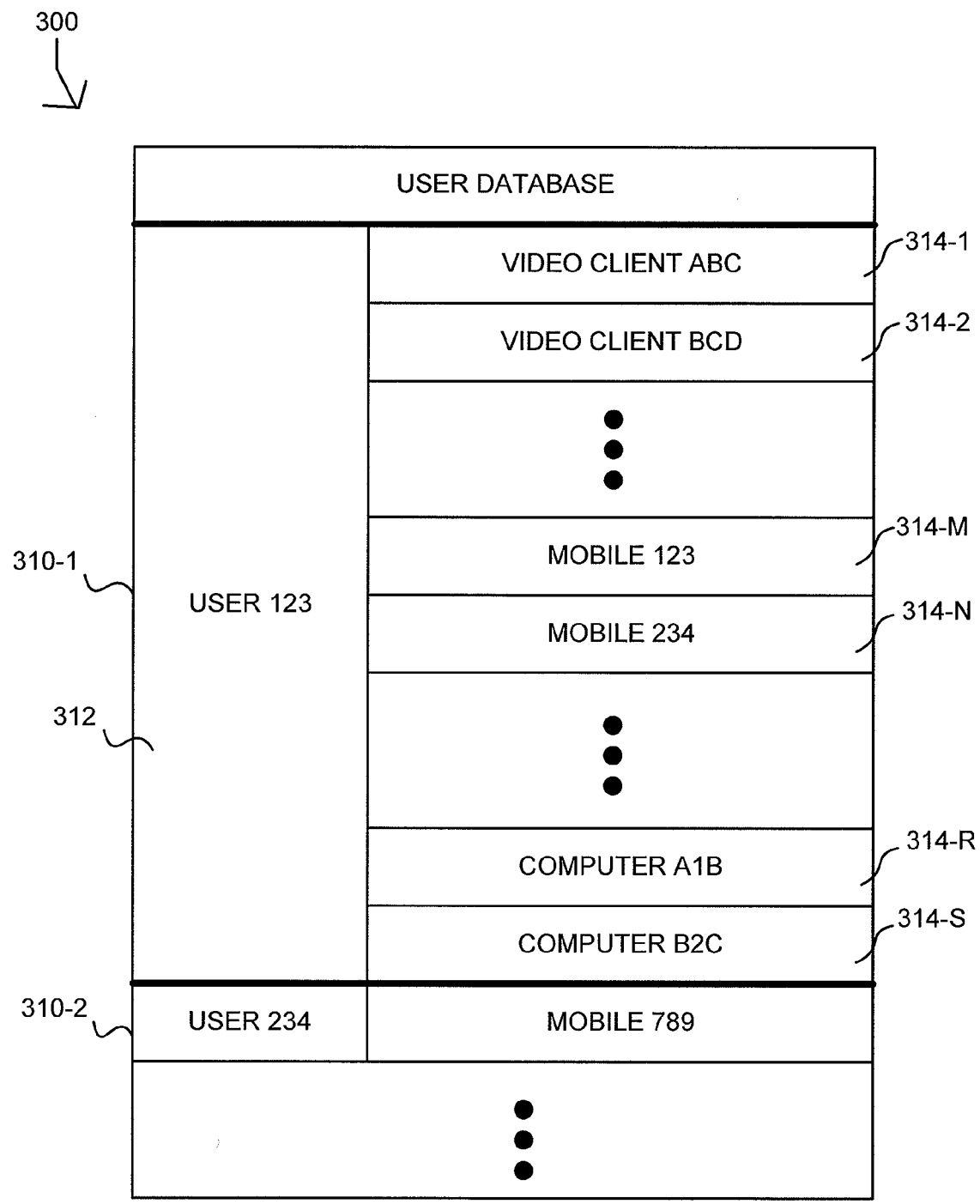
FIG. 3 is a diagram of an exemplary user database that may be maintained in the network of FIG. 2.

FIG. 3 is a diagram of an exemplary user database 300 that may be implemented by metadata storage component 214. User database 300 may include a number of entries 310-1, 310-2, etc. corresponding to a number of users of the food ordering system. In one implementation, each of the fields in entries 310 may be searchable. An exemplary entry 310-1 may include a field 312 that identifies a particular user, and one or more fields 314-1, . . . , 314-S (where S≥1) that identify one or more devices associated with the user. The information in field 312 may include a username or another string of characters that uniquely identifies a particular user. Each of field(s) 314 may include a device identifier. In the case of a television device, the device identifier may include a unique identifier of a television or an associated video client (e.g., set top box or cable card). In the case of a mobile device, the device identifier may include a unique identifier of a mobile device, such as a telephone number, a mobile identification number (MIN), an electronic serial number (ESN), etc. In the case of a computer device, the device identifier may include an Internet Protocol (IP) or media access control (MAC) address.

Figure 4:
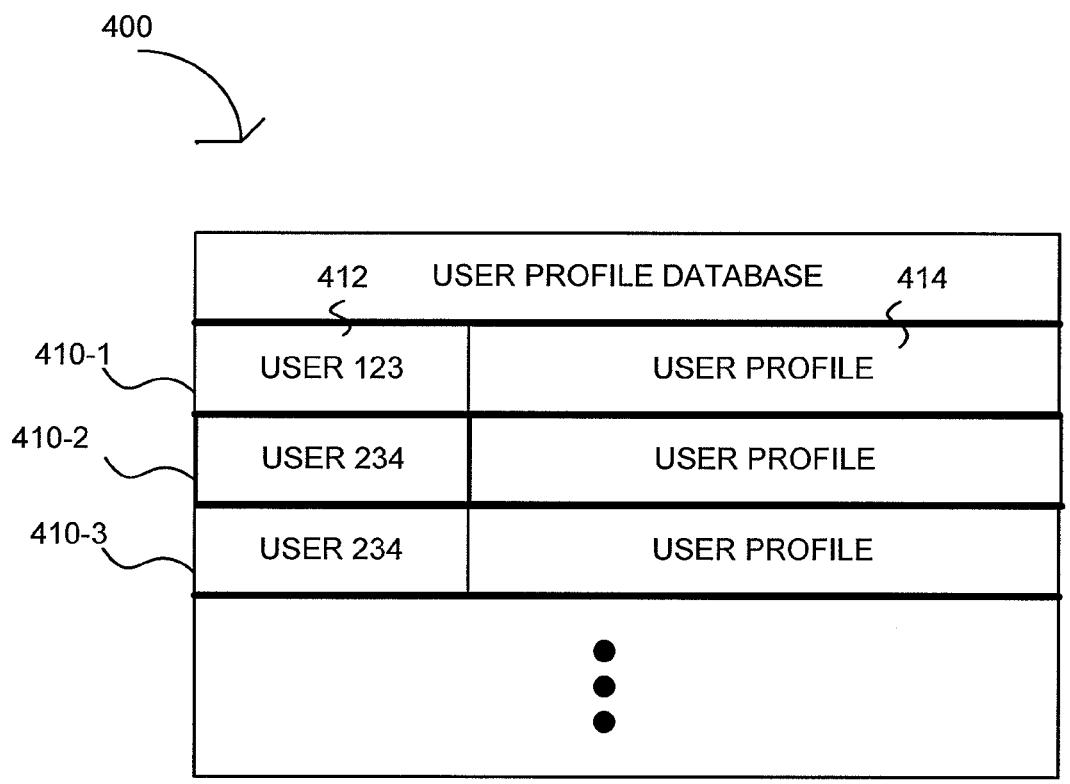
FIG. 4 is a diagram of an exemplary user profile database that may be maintained in the network of FIG. 2.

FIG. 4 is a diagram of an exemplary user profile database 400 that may be implemented by metadata storage component 214. User profile database 400 may include a number of entries 410-1, 410-2, 410-3, etc. corresponding to a number of users of the food ordering system. An exemplary entry 410-1 may include a field 412 that identifies a particular user, and a field 414 that includes information associated with the user. The information in field 412 may include a username or another string of characters that uniquely identifies a particular user. Field 414 may include user profile information. The user profile information may include information that may be obtained when interacting with the user, such as information regarding recent orders that the user placed, favorite orders that the user has identified, recent restaurants with which the user has placed an order, favorite restaurants that the user has identified, contact information for the user (e.g., address, telephone number, email address, etc.), and/or payment information obtained from the user (e.g., credit card information, debit information, etc.). Oftentimes, users regularly order the same food items and/or order from the same restaurants. Thus, the food system may permit the users to identify particular food items and/or restaurants as favorites. All of the user profile information may be accessible and editable by the user via any of the user devices.

Returning to FIG. 2, SHE 220 may connect to VHO 230. SHE 220 may include a national content server 222. National content server 222 may include a source of for-pay television broadcasts (e.g., TNT, ESPN, HBO, Cinemax, CNN, etc.) and/or web-based content (e.g., streaming content from web sites).

VHO 230 may connect to data center 210, SHE 220, VSO 240, and network 260. VHO 230 may include an on-demand server 232, a regional content server 234, an advertisements (ads) server 236, and an interactive applications server 238.

On-demand server 232 may include one or more components that may provide on-demand services (e.g., music, video, and/or games on-demand). On-demand server 232 may include a database (not shown) that may store on-demand content that may be provided by on-demand server 232.

Regional content 234 may include one or more components that may provide free television broadcasts (e.g., local broadcasts, such as NBC, CBS, ABC, and Fox). Ads server 236 may control what advertising content (e.g., commercials) is presented in connection with the national and/or regional video content. Ads server 236 may also control what advertising content is provided in connection with web or telephone content. Ads server 236 may also store scheduling information or other information that may be useful in serving and/or targeting the advertising content. Ads server 236 may insert interactive triggers into advertising content that may be interpreted by a user device. For example, ads server 236 may insert an interactive trigger into advertising content, such as a commercial, such that when the user views the commercial, the user can select an on-screen control that may activate the interactive trigger that causes the food ordering system to be contacted to permit the user, for example, to order a food item shown in the commercial.

Interactive applications server 238 may include a component that is capable of managing the serving of interactive content. Interactive content may include any form of content with which a user can interact. For example, interactive content may include an interactive program guide, a food ordering service, special promotions or discounts, interactive advertisements, sports statistics, a service for providing weather or traffic information, and/or offers of audio or video information for playing or purchase.

Interactive applications server 238 may interact with a user via a user interface client. The user interface client may reside on VHO 230, computer device 254, video client 256, and/or mobile device 290. In the case of computer device 254, the user interface client may present a user interface that resembles a web page. In the case of television device 258, the user interface client may be integrated into an interactive program guide or streamed to video client 256 as, for example, an MPEG-2 video. In the case of mobile device 290, the user interface client may be downloaded to mobile device 290 (e.g., using an environment like Binary Runtime Environment for Wireless (BREW) or Flash Lite), or accessed on the network using mobile web technology that requires no downloadable components.

Figure 5A:
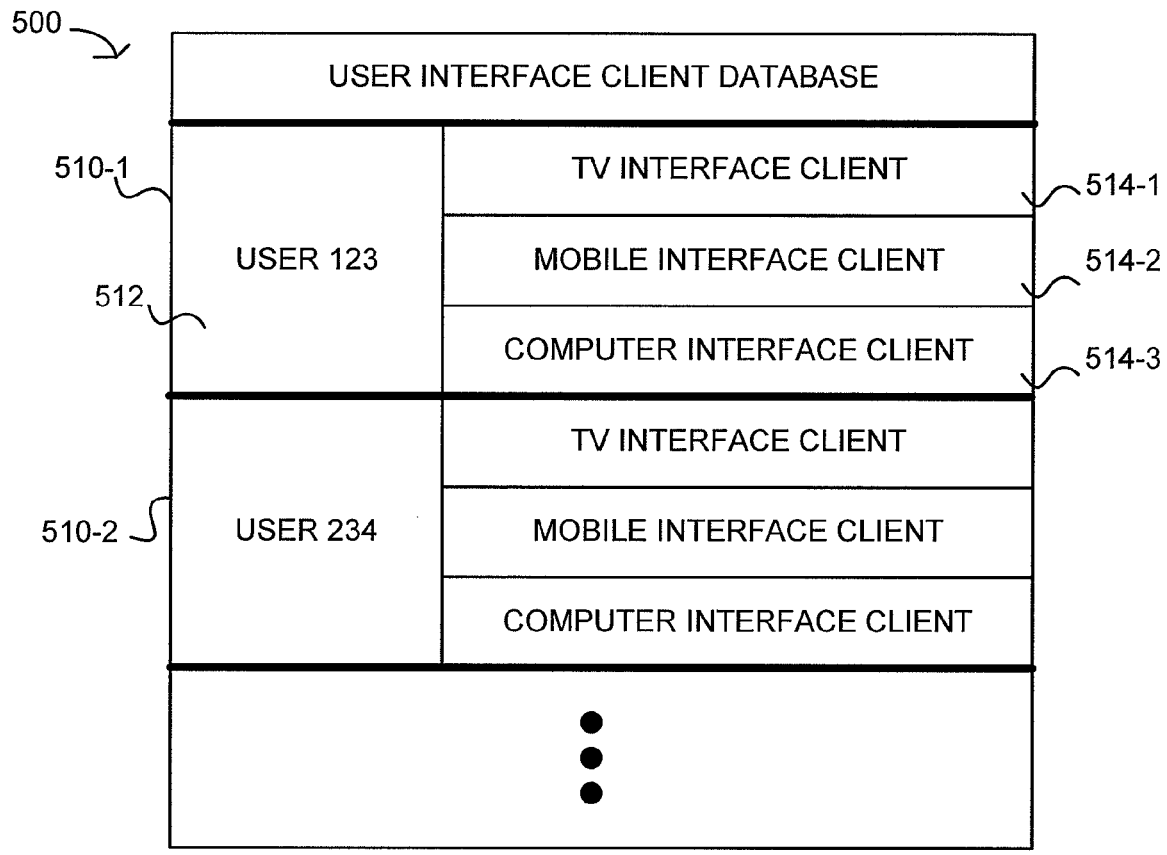
FIG. 5A is a diagram of an exemplary user interface client database that may be maintained in the network of FIG. 2.

In the context of the food ordering service, interactive applications server 238 may tailor user interface clients per user and/or per device that the user is using to communicate with the food ordering system. FIG. 5A is a diagram of an exemplary user interface client database 500 that may be maintained by the interactive applications server 238. User interface client database 500 may include a number of entries 510-1, 510-2, etc. corresponding to a number of users of the food ordering system. An exemplary entry 510-1 may include a field 512 that identifies a particular user, and one or more fields 514-1, 514-2, 514-3 that identify one or more devices associated with the user. The information in field 512 may include a username or another string of characters that uniquely identifies a particular user. Each of field(s) 514 may include information regarding a particular user interface client that may be presented for a particular type of user device (e.g., TV, mobile, computer). The user interface client may specify the layout of information presented to the user and/or what information is presented to the user via one or more user interfaces. The user interface clients may be user-configurable. In the implementation of FIG. 5A, the user interface clients are tailored for particular users and particular user devices associated with the users.

Figure 5B:
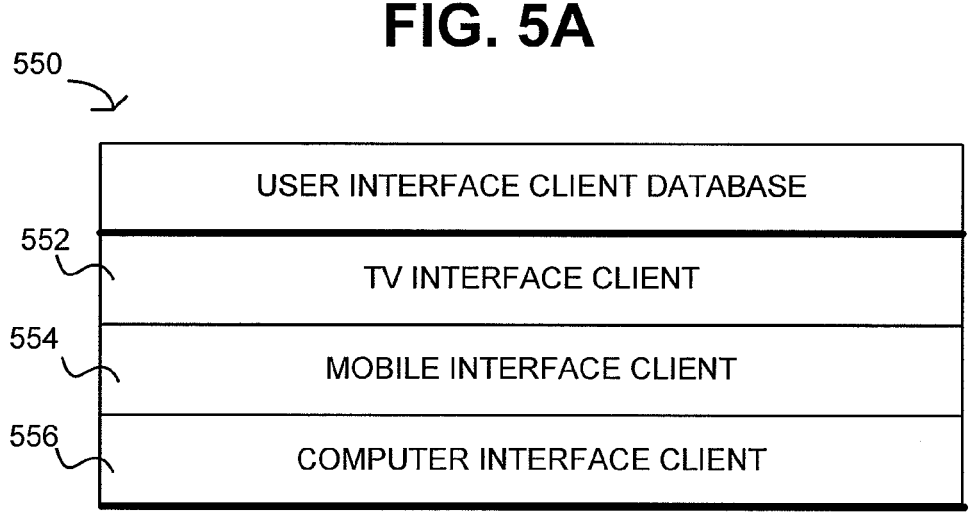
FIG. 5B is a diagram of an alternative exemplary user interface client database that may be maintained in the network of FIG. 2.

FIG. 5B is a diagram of an alternative exemplary user interface client database 550 that may be maintained by the interactive applications server 238. User interface client database 550 may include a number of entries 552, 554, 556, etc. corresponding to a number of different user devices that users of the food ordering system may use. Each of entries 552, 554, 556, etc. may include information regarding a particular user interface client that may be presented for a particular type of user device (e.g., TV, mobile, computer). The user interface client may specify the layout of information presented to the user and/or what information is presented to the user via one or more user interfaces. In the implementation of FIG. 5B, the user interface clients may be tailored for particular user devices associated with the users.

Returning to FIG. 2, VSO 240 may connect to VHO 230 and home components 250. VSO 240 may include a content server 242. Content server 242 may include a content mixing engine (e.g., a multiplexer/demultiplexer) to select information, such as on-demand content, regional and national video content, interactive content, and/or advertising content, and mix the information together. Content server 242 may optionally also perform transcoding of the mixed information and/or or encoding or encryption functions.

Home components 250 may connect to VSO 240. Home components 250 may include a set of components associated with a user's residence. For example, home components 250 may include an optical network terminal (ONT) 252, a computer device 254, a video client 256, and a television (TV) device 258. In another implementation, home components 250 may also include other home components, such as a landline or VoIP telephone (not shown). In yet another implementation, home components 250 may include components located outside of the user's residence, such as components located at work or at a vacation home.

ONT 252 may include a component that may convert the format of signals. For example, ONT 252 may convert fiber-optic signals to signals appropriate for copper wires, and vice versa. Computer device 254 may include any form of computer component, such as a personal computer or a lap top computer. Video client 256 may include a component that is capable of receiving and processing the information from VSO 240 for display on TV device 258. Video client 256 may perform decoding and/or decryption functions on information received from VSO 240. In one implementation, video client 256 may take the form of a set-top box or a cable card. TV device 258 may include a component that is capable of receiving and reproducing video and audio signals, such as video and audio signals associated with television content.

Network 260 may include, for example, a local area network, a wide area network (e.g., the Internet), an intranet, a telephone network (e.g., the Public Switched Telephone Network (PSTN) or a cellular network), or a combination of networks. BSS 270 may include a component that may control traffic and signaling with a mobile device. BSS 270 may perform transcoding of speech channels, allocation of radio channels to mobile devices, paging, quality management of transmission and reception, and many other tasks related to communication on a radio network. Antenna 280 may include a transducer to transmit or receive radio waves. Mobile device 290 may include a radiotelephone, a personal communications system (PCS) terminal, a personal digital assistant (PDA), a lap top, or another portable communication device. In one implementation, mobile device 290 may include a multi-modal application that can, for example, receive audible (speech) input and provide text and/or graphics output.

FIG. 6 is a diagram of exemplary elements of a device 600 that may correspond to RMI database component 212, metadata storage component 214, national content server 222, on-demand server 232, regional content server 234, ads server 236, interactive applications server 238, content server 242, computer device 254, video client 256, and/or mobile device 290. In another implementation, device 600 may include more, fewer, or different components.

Device 600 may include a bus 610, a processor 620, a memory 630, an input element 640, an output element 650, and a communication interface 660. Bus 610 may include a path that permits communication among the components of device 600.

Processor 620 may include a processor, microprocessor, or processing logic that may interpret and execute instructions. Memory 630 may include any type of dynamic storage device that may store information and instructions for execution by processor 620, any type of non-volatile storage device that may store information for use by processor 620, and/or any type of removable storage device.

Input element 640 may include a mechanism that permits an operator to input information to device 600, such as a keyboard, a keypad, a button, a switch, etc. Output element 650 may include a mechanism that outputs information to the operator, such as a display, a speaker, one or more light emitting diodes (LEDs), etc. Communication interface 660 may include any transceiver-like mechanism that enables device 600 to communicate with other devices and/or systems. For example, communication interface 660 may include an Ethernet interface, an optical interface, a coaxial interface, a radio interface, or the like.

As will be described in detail below, device 600 may perform certain operations relating to ordering food items. Device 600 may perform these operations in response to processor 620 executing software instructions contained in a computer-readable medium, such as memory 630. A computer-readable medium may be defined as a physical or logical memory device.

The software instructions may be read into memory 630 from another computer-readable medium or from another device via communication interface 660. The software instructions contained in memory 630 may cause processor 620 to perform processes that will be described later. Alternatively, hardwired circuitry may be used in place of or in combination with software instructions to implement processes described herein. Thus, implementations described herein are not limited to any specific combination of hardware circuitry and software.

Figure 7A:
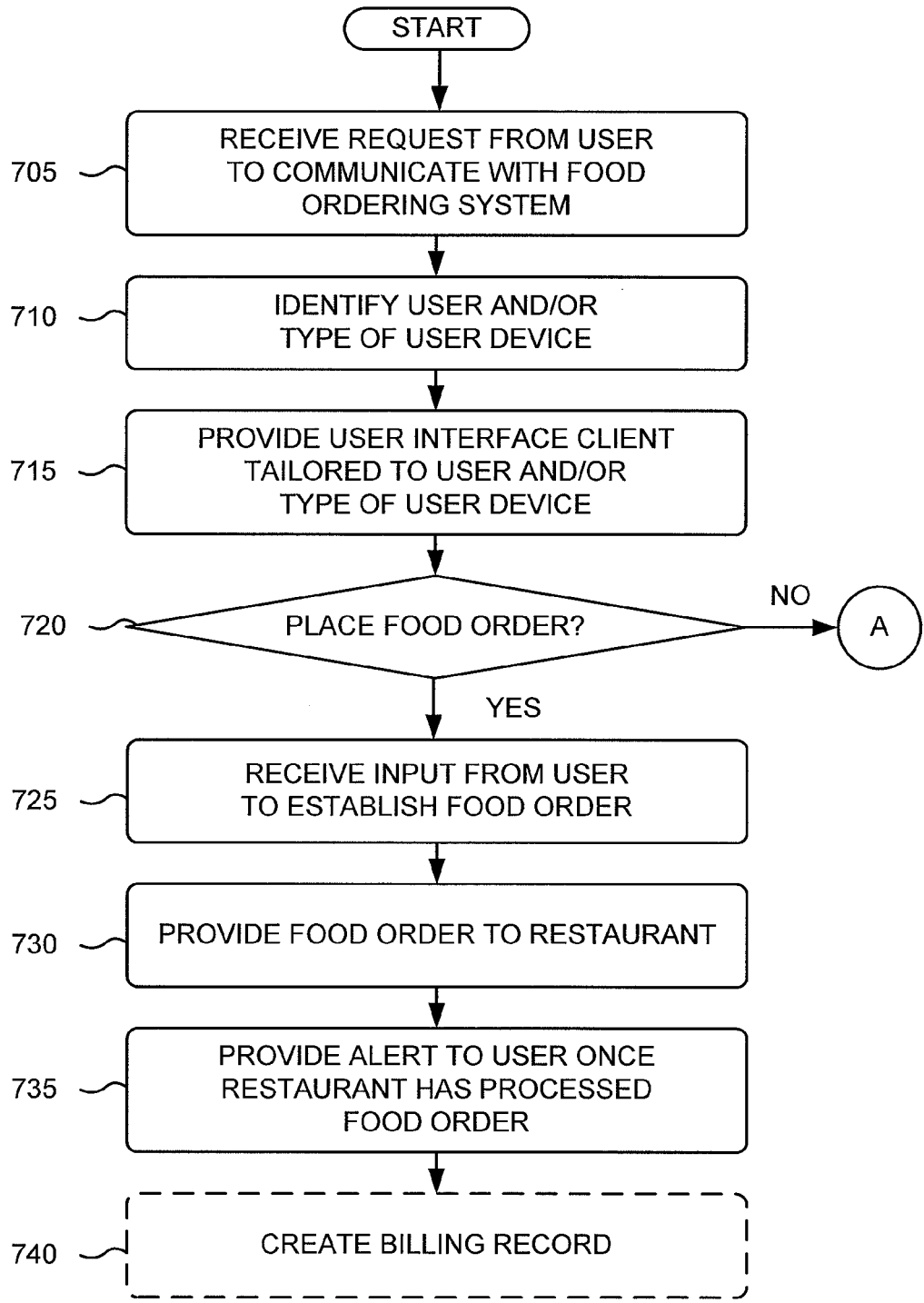
FIGS. 7A and 7B present a flowchart of an exemplary process for interacting with the food ordering system of FIG. 2.
Figure 7B:
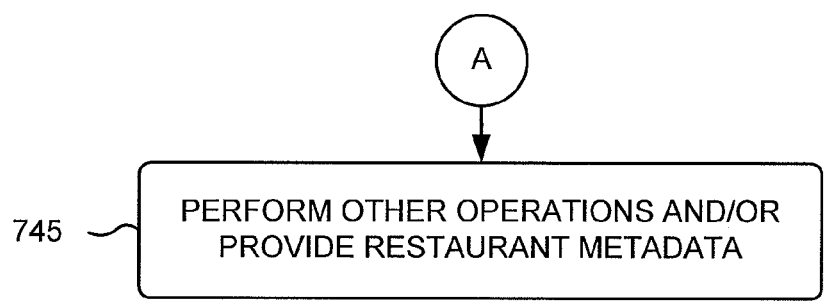

FIGS. 7A and 7B present a flowchart of an exemplary process for interacting with the food ordering system. In one implementation, one or more of the process blocks of FIGS. 7A and 7B may be performed by one or more software and/or hardware components within interactive applications server 238, computer device 254, video client 256, and/or mobile device 290.

The process may include receiving a request from a user to communicate with the food ordering system (block 705) (FIG. 7A). As explained above, the user may use a number of different types of user devices (e.g., computer device 254, television device 258, and mobile device 290) to contact the food ordering system. When using computer device 254, the user may navigate to a particular web site and computer device 254 may transmit the request to the food ordering system. When using television device 258, the user may select a button on a remote control and video client 256 may transmit the request to the food ordering system. When using mobile device 290, the user may enter a particular telephone number into mobile device 290 and select a call button, or the like, and mobile device 290 may initiate contact with the food ordering system and transmit the request to the food ordering system.

As further shown in FIG. 7A, the user and/or the type of user device may be identified (block 710). The food ordering system may identify the user and/or the type of user device in a variety of ways. For example, the food ordering system may automatically identify the user based on an identifier associated with the user device. In the case of computer device 254, the food ordering system may automatically identify the user based on an IP or MAC address associated with computer device 254. In the case of television device 258, the food ordering system may automatically identify the user based on an identifier associated with video client 256. In the case of mobile device 290, the food ordering system may automatically identify the user based on a telephone number, a MIN, or an ESN associated with mobile device 290. The food ordering system may use the identifier associated with the user device to identify the corresponding user in user database 300 (FIG. 3). Alternatively, or additionally, the food ordering system may confirm the identity of the user by presenting the user with what the food ordering system believes is the name of the user and requesting that the user confirm it or correct it if the name is incorrect. Alternatively, or additionally, the food ordering system may identify, or confirm the identity of, the user by requiring the user to log into the food ordering system using, for example, a username and password.

The food ordering system may identify the type of user device based, for example, on the type or format of the request that the food ordering system receives. In the case of computer device 254, the food ordering system may identify the type of user device as a computer device if the food ordering system receives a request in a format particular to computer devices. In the case of television device 258, the food ordering system may identify the type of user device as a television device if the food ordering system receives a request in a format particular to video clients. In the case of mobile device 290, the food ordering system may identify the type of user device as a mobile device if the food ordering system receives a request in a format particular to mobile devices.

As further shown in FIG. 7A, a user interface client tailored to the user and/or the type of user device may be identified (block 715). In one implementation, the food ordering system may identify a particular user interface client to use for the user by accessing, for example, user interface client database 500 (FIG. 5A) or user interface client database 550 (FIG. 5B). For example, the food ordering system may access user interface client database 500 to identify a user interface client that is tailored to the user and the type of user device. Alternatively, the food ordering system may access user interface client database 550 to identify a user interface client that is tailored to the type of user device without regard to the particular user. The food ordering system may obtain the particular user interface client from user interface client databases 500 or 550 and present a user interface associated with the particular user interface client to the user device being used by the user. As described above, the user interface client may include software that operates on VHO 230, may include software that is downloaded and operates on the user device, and/or may include a portion of software that operates on VHO 230 and a portion of software that operates on the user device.

It may be determined whether the user desires to place a food order (block 720). This determination may be made, for example, based on input from the user, such as the user inputting a command using a keyboard of computer device 254, the user issuing an instruction to video client 256 using a remote control, or selecting a button on mobile device 290.

If the user desires to place a food order (block 720-YES), the food order may be established through input received from the user (block 725). For example, the food ordering system may present information to the user within the user interface to facilitate the placing of a food order. The information might include restaurant metadata that may be present within RMI database component 212, such as restaurant information, menu items information, and/or other information that might be useful in the food ordering system. The information might also, or alternatively, include information that may be present within metadata storage component 214, such as information regarding recent orders that the user placed, favorite orders that the user has identified, recent restaurants with which the user has placed an order, favorite restaurants that the user has identified, contact information for the user, and/or payment information associated with the user. The user may interact with the user interface to select a restaurant, select one or more menu items, identify a manner for obtaining the menu items, and identify a method of payment.

Alternatively, or additionally, the user may be permitted to filter and/or search using food attributes (e.g., calorie information, ingredients, descriptors, etc.). For example, when searching for food, the user may select particular food attributes to include or exclude from the search results, thereby assisting the user in quickly finding the food item(s) that the user desires. The user might also search using the full text of the titles and/or the descriptions of the menu items to find food item(s) of interest.

As further shown in FIG. 7A, the food order may be provided to the restaurant (block 730). The food ordering system may have an agreement in place with each of its participating restaurants regarding the manner in which food orders may be provided. For example, the food ordering system may send a food order to a restaurant via email, text message, fax, automated voice call, or in another manner. The food ordering system may provide the restaurant with typical food ordering information, such as the user's name, the user's contact information, the menu items the user ordered, the user's method of payment, and/or other information that the restaurant might find useful in servicing the food order.

An alert may be provided to the user once the restaurant has processed the food order (block 735). For example, the restaurant may notify the food ordering system if it has processed the food order. The food ordering system may then provide an alert to the user notifying the user that the restaurant has processed the food order. In one implementation, the food ordering system may send the alert to the same user device that the user used to communicate with the food ordering system. In another implementation, the food ordering system may permit a user to identify how the user desires to receive alerts. In this case, the food ordering system may send the alert to the user device specified by the user.

A billing record may optionally be created (block 740). In one implementation, the restaurant may charge the user in some manner (e.g., charging a credit card or debiting a debit card). In one alternative implementation, the food ordering system may pay the restaurant and bill the user. In this situation, the food ordering system may generate a single bill across all of the user devices. Additionally, or alternatively, if the food ordering system is a service provider, then the food ordering system may include a charge for a food order on its bill for providing its particular service.

If the user does not desire to place a food order (block 720-NO), other operations may be performed and/or restaurant metadata may be provided (block 745) (FIG. 7B). For example, the food ordering system may permit the user to provide or update the user's contact information or payment information. Alternatively, or additionally, the food ordering system may permit the user to identify favorite restaurants and/or orders. Alternatively, or additionally, the food ordering system may permit the user to search for a particular restaurant and/or a particular food item. Alternatively, or additionally, the food ordering system may present restaurant metadata to the user, such as information that might be present in RMI database component 212.

FIGS. 8A-8H are diagrams of exemplary user interfaces that may be presented to a user via a television device. Assume that a user, Alice, has some friends coming over to watch a basketball game. When her friends arrive, Alice turns on her television device 258 and tunes her video client 256 to the channel broadcasting the basketball game.

Figure 8A:
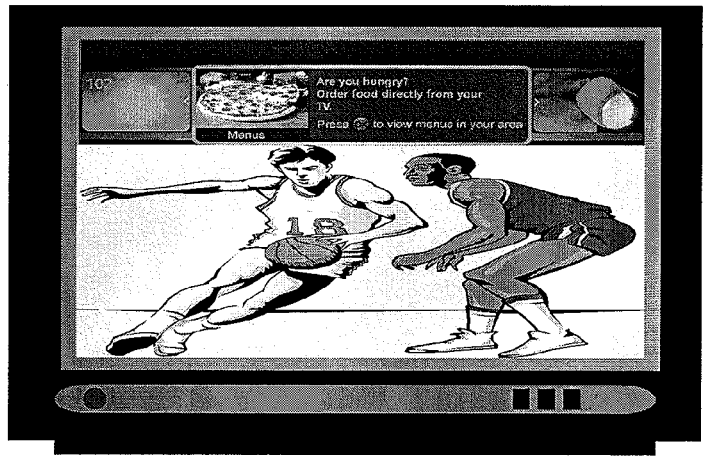
FIGS. 8A-8H are diagrams of exemplary user interfaces that may be presented to a user via a television device.

A food ordering service window may be presented on the screen, as shown in FIG. 8A. The food ordering service window may be presented in response to someone pressing a particular button on a remote control. Alternatively, the food ordering service window may be triggered by a restaurant commercial presented on television device 258. In this case, content server 242 may embed a tag into the video stream to trigger presentation of the food ordering service window.

Figure 8B:
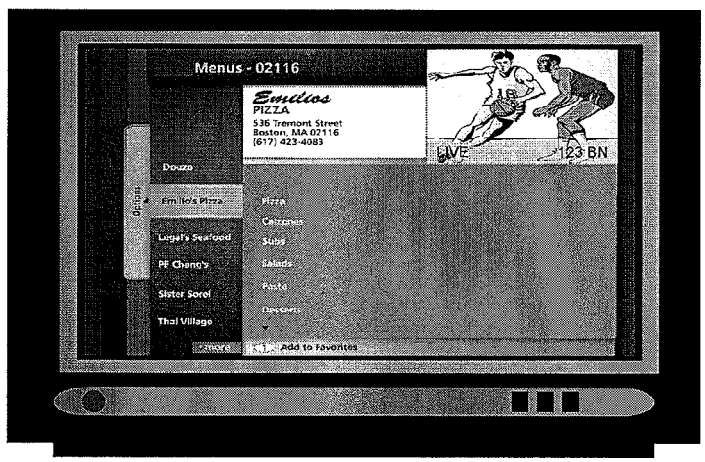

If Alice expresses a desire to view restaurant menus, she may press a button on her remote control. In response, a list of local restaurants may be presented on television device 258, as shown in FIG. 8B. A scaled down version of the basketball game may continue playing in a portion of the screen while Alice and her friends order food, as shown in FIG. 8B. Thus, they can order food while still watching the game.

Though not specifically shown in FIG. 8B, Alice may be presented with a list of restaurants from which Alice has recently ordered, a list of restaurants that Alice has identified as her favorites, a list of food items that Alice has recently ordered, a list of food items that Alice has identified as her favorites, and/or other information. Alice may cause this information to be presented by selecting the "options" item, as shown in FIG. 8B, using her remote control.

Figure 8C:
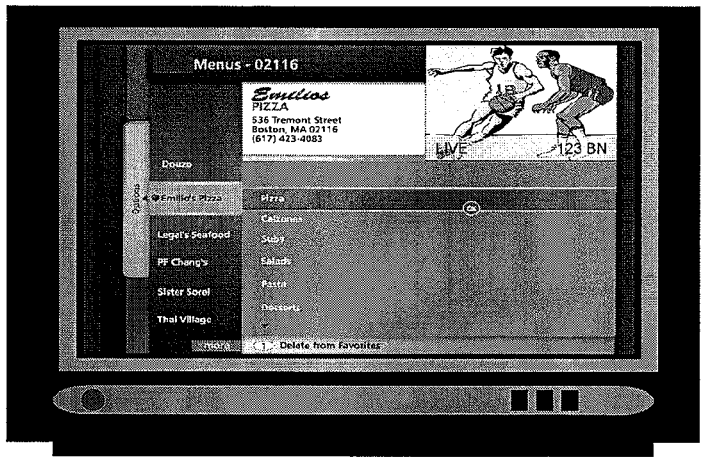

Assume that Alice and her friends want to get pizza so they select Emilio's Pizza, as shown in FIG. 8C, using her remote control. Knowing that basketball season has just started and that she is going to have friends over to watch basketball all the time, Alice decides to tag Emilio's Pizza as one of her favorite restaurants so that she can quickly access it later. For example, she may press the "1" button on her remote control and add it as a favorite. A red heart icon appears beside Emilio's Pizza to let her know that it was set as a favorite.

Figure 8D:
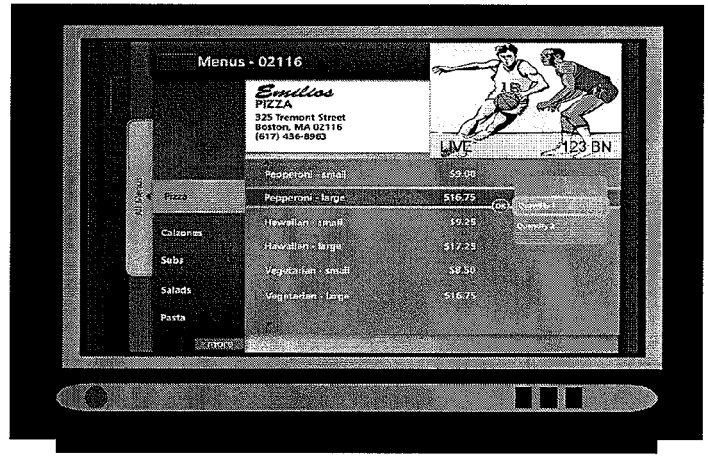
Figure 8E:
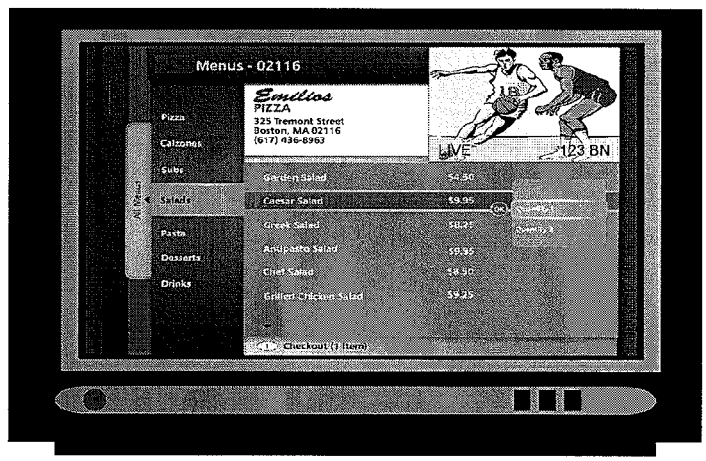
Figure 8F:
Figure 8G:
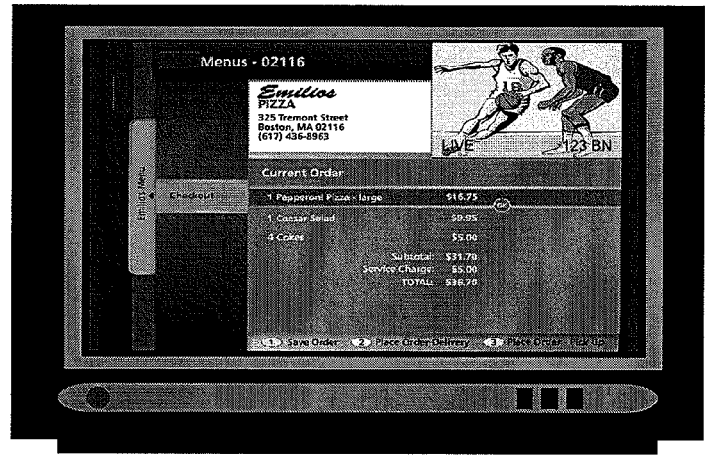

Alice may drill down to see what kinds of pizza choices are available, as shown in FIG. 8D. Alice and her friends may decide to get a large pepperoni pizza, a Caesar salad, and four cokes, as shown in FIGS. 8D-8F. When she finishes with her order, Alice may be presented with her completed order, as shown in FIG. 8G. Alice may then save the order as a favorite if she believes that she might get the same order again (e.g., by pressing the "1" button on her remote control), as shown in FIG. 8G. Alice may designate the order for delivery or pickup by pressing the "2" button or "3" button, respectively, on her remote control, as shown in FIG. 8G.

Figure 8H:
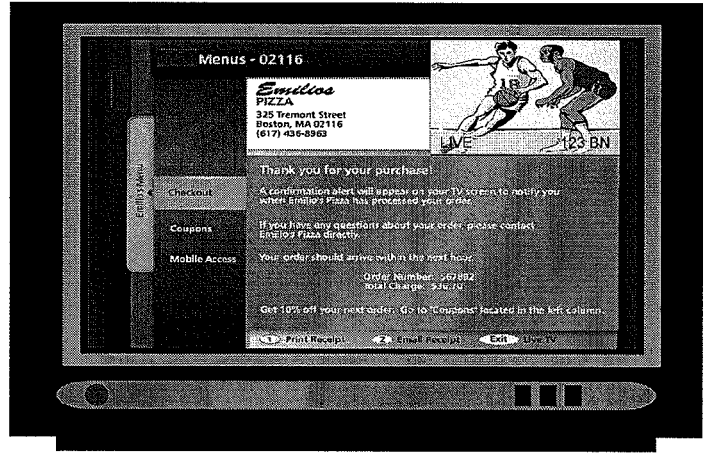

Alice's order may be processed by the food ordering system and provided to Emilio's Pizza. Alice may also be presented with a confirmation screen that provides an order number and the total charge, as shown in FIG. 8H. Alice may later be presented with a confirmation alert on the screen of her television device 258 when Emilio's Pizza has processed her order.

FIGS. 9A-9G are diagrams of exemplary user interfaces that may be presented to a user via a mobile device. Assume that a user, Alice, is running late. She was supposed to be home already but got delayed while running errands and is currently waiting in line at the pharmacy. She looks at her watch and realizes that her friends are going to be over soon to watch a basketball game again and she has not had time to order dinner. Luckily, she and her friends have already decided to get pizza again tonight.

Figure 9A:
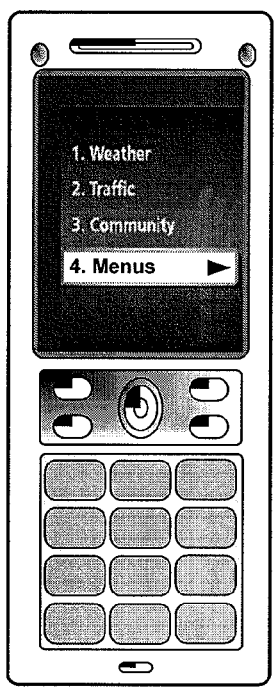
FIGS. 9A-9G are diagrams of exemplary user interfaces that may be presented to a user via a mobile device.
Figure 9B:
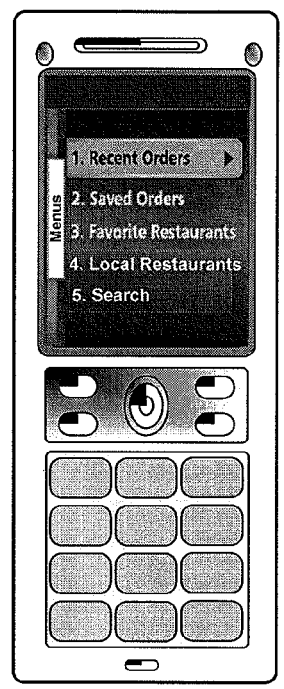

Alice may power up her mobile device 290, and may navigate to a menu item associated with the food ordering system, which is shown as "Menus" in FIG. 9A. Alice may select the "Menus" item using a button on her mobile device 290. Alice may be presented with a list of options, including "Recent Orders," "Saved Orders," "Favorite Restaurants," "Local Restaurants," and "Search," as shown in FIG. 9B. Selection of the Recent Orders option may cause information regarding food orders that were recently placed by the user (e.g., placed within the last X days, the last Y orders, etc.) to be presented. Selection of the Saved Orders option may cause information regarding food orders that the user identified as favorites to be presented. Selection of the Favorite Restaurants option may cause information regarding restaurants that the user identified as favorites to be presented. Selection of the Local Restaurants option may cause information regarding restaurants local to the user to be presented. For example, the food ordering system may determine the current location of the user (e.g., using GPS or another technique for identifying the user's geographic location) and identify restaurants close to the user. Selection of the Search option may provide an interface via which the user can enter a search term to search for particular restaurants and/or food items.

Figure 9C:
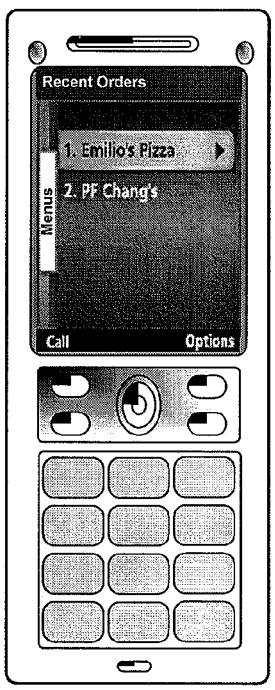
Figure 9D:
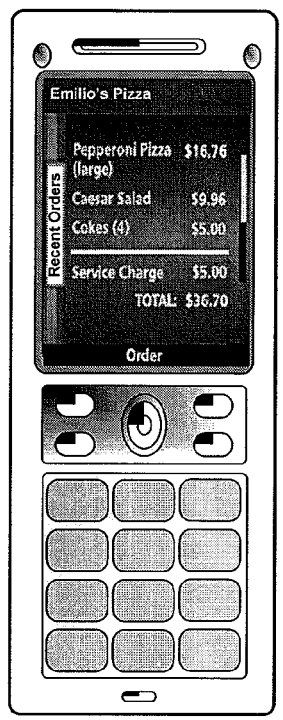
Figure 9E:
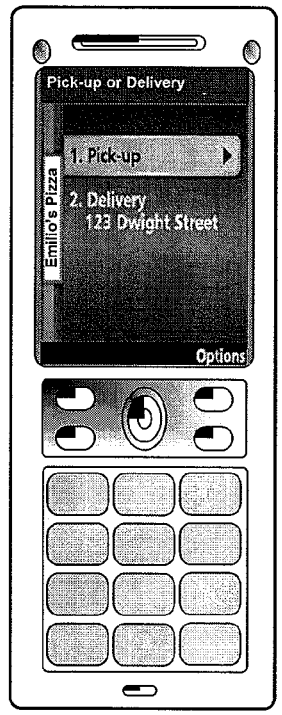

Assume that Alice selects "Recent Orders" and then "Emilio's Pizza" since she recently ordered pizza from Emilio's Pizza, as shown in FIGS. 9B and 9C. Alice may be presented with her recent order of a large pepperoni pizza, a Caesar salad, and four cokes, as shown in FIG. 9D. Alice may confirm that the order and total are correct and may press a button on her mobile device 290 to place the order. Alice may be presented with an option to pick-up the order or to have it delivered, as shown in FIG. 9E. Alice may decide to pick up the order on the way home.

Figure 9F:
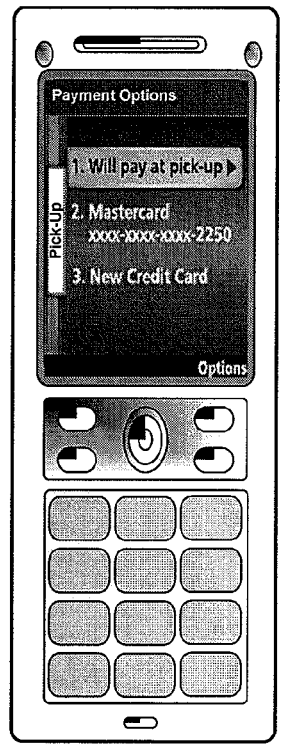
Figure 9G:
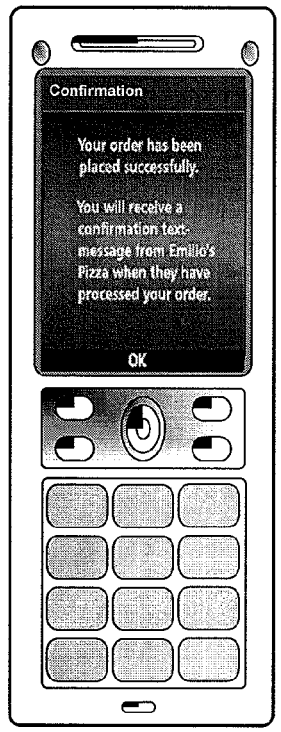

Alice may be presented with payment options, including paying for the order when she picks up the order, charging the order to her already-registered credit card, or charging the order to a new credit card, as shown in FIG. 9F. Alice may decide to pay for the order when she picks it up. Alice may be presented with a confirmation message that indicates that she will receive a text message when her order is processed by Emilio's Pizza, as shown in FIG. 9G.

Figure 10:
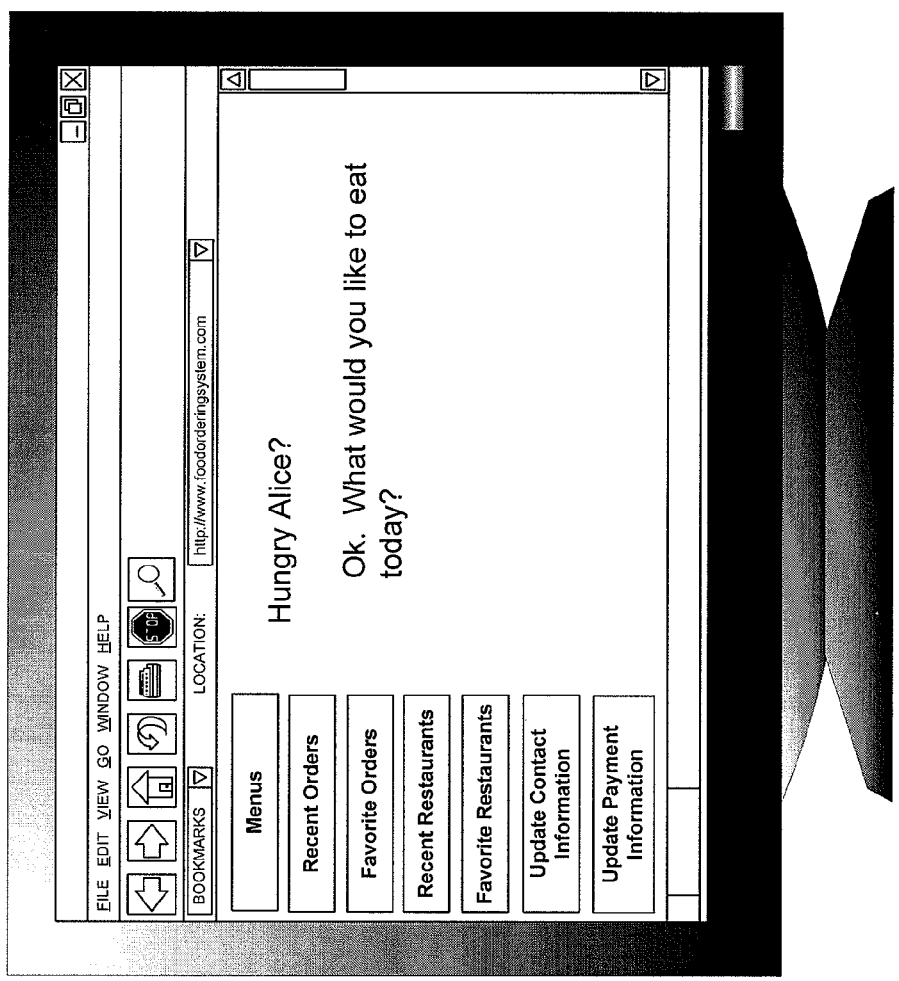
FIG. 10 is a diagram of an exemplary user interface that may be presented to a user via a computer device.

FIG. 10 is a diagram of an exemplary user interface that may be presented to a user via a computer device. Assume that a user, Alice, is still at work. She has had an incredibly long day and all she wants to do is go home, eat something, and then watch some of her favorite television shows. She cannot even think about cooking dinner, so she decides to order take-out.

Alice may use her computer device to access a web site associated with the food ordering system, as shown in FIG. 10. The food ordering system may recognize Alice, for example, based on the IP or MAC address of the computer device (provided that Alice has previously used this computer device to access the food ordering system or has previously registered the computer device with the food ordering system). Alternatively, or additionally, the food ordering system may request that Alice log into the food ordering system using, for example, a username and password.

The web site may present Alice with various options, such as "Menus," "Recent Orders," "Favorite Orders," "Recent Restaurants," "Favorite Restaurants," "Update Contact Information," and "Update Payment Information." If Alice selects Menus, the web site may present Alice with a list of restaurants that are local to Alice. If Alice selects the Recent Orders option, the web site may present Alice with one or more orders that Alice recently placed via the food ordering system. If Alice selects the Favorite Orders option, the web site may present Alice with one or more orders that Alice has previously designated as a favorite. If Alice selects the Recent Restaurants option, the web site may present Alice with the name of one or more restaurants with which Alice recently placed an order via the food ordering system. If Alice selects the Favorite Restaurants option, the web site may present Alice with the name of one or more restaurants that Alice has previously designated as a favorite. If Alice selects the Update Contact Information option, the web site may permit Alice to update her name, address, telephone number, email address, mobile number, etc. If Alice selects the Update Payment Information option, the web site may permit Alice to update her credit card information, debit card information, etc.

Assume that Alice chooses to select from one of her favorite restaurants. She may scroll through a list of favorite restaurants and may select Anthony's restaurant because she is in the mood for Greek food. Alice may peruse Anthony's menu and may select the food items that interest her. She may select the checkout button and after a few more selections, she may submit her order and designate that she will pick it up on her way home.

By giving consumers easy access to local restaurant menus on a number of different types of devices that they use everyday, the consumers no longer have to keep track of all of these menus and they can be assured that the menus are up-to-date, including any recent price or menu changes.

In addition, unlike other consumer purchases, when people order take-out or delivery, they tend to order the same menu items or only make slight adjustments to the order. They also tend to have favorite restaurants from which to order. Therefore, having a mechanism that keeps track of a household's order or a favorite restaurant can be a time saver. The food ordering system described herein may do just that. It may track household orders and favorite restaurants so that the next time they want to order food or want to access their favorite restaurant's menu, they can easily do it, regardless of whether they are in front of their television, on the go with only their mobile device, or at work sitting at their computer. That is because the information may be stored within a multi-platform network.

Currently, if consumers want to order food from their mobile device, they typically have to know the telephone number of the restaurant and the menu items they want to order. In most cases, this information might not be readily available to them. But by having their recent orders stored on a multi-platform network, they can easily access it through their mobile device and order food within a few clicks. This is nice because it can cut down on potential errors that can be made by placing voice orders over the telephone. By transmitting an order through a device that has a specific ordering tool built into it, these errors can be eliminated. For example, the food ordering system described herein may present an order visually to the restaurant, which may reduce the opportunity for misunderstanding a voice order. The food ordering system can also assure accurate and expedient delivery by transmitting the user's address information along with the order.

At the same time, the food ordering system is also beneficial to local restaurants as an advertising medium. One of the most frustrating things for local businesses is figuring out how to get their message across. That is because within the television, mobile, and Internet space, most local businesses have to compete with national advertisers who have much bigger advertising budgets. The food ordering system gives local restaurants (one of the biggest spenders in local advertising) visibility because when consumers order take-out or delivery, they normally order from their local restaurants. Therefore, having a mechanism that allows local restaurants to advertise their menus on television screens, mobile devices, and web sites to an audience they are trying to reach, is incredibly unique, new, and appealing.

Another frustrating issue for local restaurants is how to easily update their take-out or delivery menu and have it distributed. For example, it is one thing for local restaurants to get new menus made but it is another thing to have their new menus distributed throughout the neighborhood. Therefore, having a way to add or update local restaurant information at one place (e.g., a website) and then have it distributed through multiple devices is not only cost-effective but a major time saver as well.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 7A and 7B, the order of the blocks may be modified in other implementations. Further, non-dependent blocks may be performed in parallel.

As used herein, the term "component," is intended to be broadly interpreted to refer to hardware, software, or a combination of hardware and software.

It has been previously described that a user can identify certain restaurants and orders as favorites. This may also be possible while the user is eating in a restaurant. For example, the user can access the food ordering system using his/her mobile device and select his/her favorite menu items as favorite orders in the food ordering system. Information regarding favorite restaurants and orders may also be used by the food ordering system to recommend certain restaurants and/or food items to users when the users are traveling to a new location.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An automated method, performed by one or more devices of a food ordering system of a multi-platform network operated by a service provider, comprising:
    storing, in a database of the food ordering system, a plurality of user identifiers, each of one or more of the user identifiers being associated with a plurality of user interface clients, where each of the plurality of user interface clients is associated with a different type of visual user interface that is tailored to one of a plurality of types of user devices;
    obtaining, by the one or more devices, information based on interaction, by a user, with the service provider using a system, of the multi-platform network, other than the food ordering system;
    receiving, at the one or more devices and from the user, a request to place a food order, from a user device using a communication system, of the multi-platform network, to access the food ordering system;
    identifying, by the one or more devices, the user;
    identifying, by the one or more devices, a type of the user device used by the user to send the request;
    selecting, by the one or more devices and based on the obtained information, a particular one, of the plurality of user interface clients, associated with the user identifier corresponding to the identified user, where the particular user interface client is associated with the type of visual user interface that is tailored to the user and to the type of the user device;
    presenting, to the identified user via the user device, the visual user interface associated with the particular user interface client;
    receiving, via the visual user interface, input from the user to establish the food order; and
    providing, by the one or more devices, the food order to a restaurant.

2. The method of claim 1, where identifying the type of the user device includes:
    identifying the user device as one of a video client, a mobile device, or a computer device.

3. The method of claim 1, further comprising:
    inserting an interactive trigger into a commercial provided to the user device, activation of the interactive trigger causing the request to be generated.

4. The method of claim 1, further comprising:
    presenting, via the visual user interface, a list of restaurants and a list of food items offered by each of the restaurants; and
    where receiving the input from the user includes:
        receiving a selection of one of the restaurants, and
        receiving a selection of one or more of the food items offered by the selected restaurant.

5. The method of claim 1, further comprising at least one of:
    presenting, via the visual user interface, a name of a restaurant that the user has previously identified as a favorite restaurant, where the name of the restaurant is presented on a screen of a first type of the user device and the name of the restaurant was previously identified as a favorite restaurant by the user using a second type of the user device, where the first type of the user device and the second type of the user device are different, or
    presenting, via the visual user interface, a food order that the user has previously identified as a favorite food order, where the food order is presented on a screen of a first type of the user device and the food order was previously identified as a favorite food order by the user using a second type of the user device, where the first type of the user device and the second type of the user device are different.

6. The method of claim 1, further comprising at least one of:
    presenting, via the visual user interface, a name of a restaurant from which the user previously ordered food, where the name of the restaurant is presented on a screen of a first type of the user device and food was previously ordered from the restaurant by the user using a second type of the user device, where the first type of the user device and the second type of the user device are different, or
    presenting, via the visual user interface, a food order that the user has previously placed, where the food order is presented on a screen of a first type of the user device and the food order was previously placed by the user using a second type of the user device, where the first type of the user device and the second type of the user device are different.

7. The method of claim 1, where the user device includes a video client, a computer device, or a mobile device; and
    where the method further comprises:
        creating a single bill that includes a first charge for the food order and a second charge for a service associated with the user device, where the service associated with the user device includes a television service if the user device is a video client, an Internet service if the user device is a computer device, or a wireless telephone service if the user device is a mobile device.

8. The method of claim 1, further comprising:
permitting the user to identify a favorite restaurant or a favorite food item; and
recommending a restaurant or a food item to the user based on the favorite restaurant or the favorite food item.

9. The method of claim 1, where providing the food order to the restaurant includes:
electronically providing, to the restaurant, the food order along with contact information for the user.

10. The method of claim 1, further comprising:
providing, to the user, an alert that identifies that the food order was processed by the restaurant.

11. The method of claim 1, further comprising:
permitting the user to specify a particular food attribute; and
identifying, to the user, one or more food items associated with the particular food attribute.

12. The method of claim 1, further comprising:
permitting the user to specify a search term;
performing a full text search of restaurant metadata to identify one or more food items based on the search term; and
identifying, to the user, the one or more food items.

13. A food ordering system of a multi-platform network operated by a service provider, the food ordering system comprising:
one or more devices to:
store a plurality of user identifiers, each of one or more of the user identifiers being associated with a plurality of user interface clients, where each of the plurality of user interface clients is associated with a different type of visual user interface that is tailored to one of a plurality of types of user devices;
obtain information based on interaction, by a user, with the service provider using a system, of the multi-platform network, other than the food ordering system;
receive, from the user, a request to place a food order, from a user device using a communication system, of the multi-platform network, to access the food ordering system;
identify one of the user identifiers corresponding to the user;
identify a type of the user device used by the user to send the request;
select, based on the one of the user identifiers and the obtained information, a particular one of the plurality of user interface clients that has an associated visual user interface that is tailored to the user and the type of the user device;
present, to the identified user via the user device, the visual user interface associated with the particular user interface client;
receive, via the visual user interface, input from the user to establish the food order; and
provide the food order to a restaurant.

14. The food ordering system of claim 13, where when identifying the type of the user device, the one or more devices are to:
identify the user device as one of a video client, a mobile device, or a computer device.

15. The food ordering system of claim 13, where the one or more devices are further to:
insert an interactive trigger into advertising content, and
provide the advertising content to the user, activation of the interactive trigger causing the food ordering system to be contacted.

16. The food ordering system of claim 13, where the one or more devices are further to:
present, via the visual user interface, a list of restaurants and a list of food items offered by each of the restaurants; and
where when receiving the input from the user, the one or more devices are to:
receive, via the visual user interface, a selection of one of the restaurants, and
receive, via the visual user interface, a selection of one or more of the food items offered by the selected restaurant.

17. The food ordering system of claim 13, where the one or more devices are further to at least one of:
present, via the visual user interface, a name of a restaurant that the user has previously identified as a favorite restaurant, where the name of the restaurant is presented on a screen of a first type of the user device and the name of the restaurant was previously identified as a favorite restaurant by the user using a second type of the user device, where the first type of the user device and the second type of the user device are different, or
present, via the visual user interface, a food order that the user has previously identified as a favorite food order, where the food order is presented on a screen of a first type of the user device and the food order was previously identified as a favorite food order by the user using a second type of the user device, where the first type of the user device and the second type of the user device are different.

18. The food ordering system of claim 13, where the one or more devices are further to at least one of:
present, via the visual user interface, a name of a restaurant from which the user previously ordered food, where the name of the restaurant is presented on a screen of a first type of the user device and food was previously ordered from the restaurant by the user using a second type of the user device, where the first type of the user device and the second type of the user device are different, or
present, via the visual user interface, a food order that the user has previously placed, where the food order is presented on a screen of a first type of the user device and the food order was previously placed by the user using a second type of the user device, where the first type of the user device and the second type of the user device are different.

19. The food ordering system of claim 13, where the user device includes a video client, a computer device, or a mobile device; and
where the one or more devices are further to:
create a single bill that includes a first charge for the food order and a second charge for a service associated with the user device, where the service associated with the user device includes a television service if the user device is a video client, an Internet service if the user device is a computer device, or a wireless telephone service if the user device is a mobile device.

20. The food ordering system of claim 13, where the one or more devices are further to:
permit the user to identify a favorite restaurant or a favorite food item, and
recommend a restaurant or a food item to the user based on the favorite restaurant or the favorite food item.

21. The food ordering system of claim 13, where when providing the food order to the restaurant, the one or more devices are to:
electronically provide, to the restaurant, the food order along with contact information for the user.

22. The food ordering system of claim 21, where the one or more devices are further to:
provide, to the user, an alert that identifies that the food order was processed by the restaurant.

23. The food ordering system of claim 13, where the one or more devices are further to:
provide, to the restaurant, an interface via which the restaurant can update information regarding the restaurant or obtain information regarding food orders provided to the restaurant via the food ordering system.

24. A food ordering system of a multi-platform network, operated by a service provider, comprising:
means for storing a plurality of user identifiers, each of the user identifiers being associated with at least one user interface client, where each of the at least one user interface client is associated with a different type of visual user interface that is tailored to one of a plurality of types of user devices;
means for obtaining information based on interaction, by a user, with the service provider using a system, of the multi-platform network, different from the food ordering system;
means for receiving, from the user and via a user device using a communication system, of the multi-platform network, a request to access the food ordering system;
means for identifying one of the user identifiers corresponding to the user;
means for determining whether the user device is a video client, a computer device, or a mobile device;
means for accessing said means for storing, to select, based on the identified user identifier, a first user interface client, with an associated first type of visual user interface, if the user device is the video client;
means for accessing said means for storing, to select, based on the identified user identifier, a second user interface client, with an associated second type of user visual interface, if the user device is the computer device;
means for accessing said means for storing, to select, based on the identified user identifier and the obtained information, a third user interface client, with an associated third type of visual user interface, if the user device is the mobile device;
means for determining, based on first input received from the user via the selected first, second, or third type of user interface client, whether the user desires to place a food order, where the first, second, and third types of user interfaces differ;
means for performing, when it is determined that the user does not desire to place the food order and based on second input received from the user via the selected first, second, or third type of user interface, other operations associated with the food ordering system;
means for receiving, when it is determined that that the user desires to place the food order and via the selected first, second, or third type of user interface, third input from the user to identify restaurant metadata; and
means for providing the identified restaurant metadata.

25. An automated method, performed by one or more devices of an item ordering system of a multi-platform network operated by a service provider, comprising:
storing, by the one or more devices, a plurality of user identifiers, each of the user identifiers being associated with at least one user interface client, where each of the at least one user interface client is associated with a different type of visual user interface that is tailored to one of a plurality of types of user devices;
obtaining, by the one or more devices, information based on interaction, by a user, with the service provider using a system, of the multi-platform network, other than the item ordering system;
receiving, by the one or more devices and from the user, a request to place an order for an item, from a user device using a communication system, of the multi-platform network, to access the item ordering system;
identifying, by the one or more devices, one of the user identifiers corresponding to the user;
identifying, by the one or more devices, a type of the user device used by the user to send the request;
selecting, by the one or more devices and based on the identified user identifier and the obtained information, one of the at least one user interface client having an associated type of visual user interface that is tailored to the user and to the type of the user device;
receiving, by the one or more devices and via the visual user interface, input from the user to establish the order for the item; and
providing, by the one or more devices, the order for the item to a business that offers the item for sale.

* * * * *